(12) United States Patent
Van Eeuwijk et al.

(10) Patent No.: US 10,776,971 B2
(45) Date of Patent: Sep. 15, 2020

(54) METADATA IN MULTI IMAGE SCENES

(71) Applicant: SIGNIFY HOLDING B.V., Eindhoven (NL)

(72) Inventors: Alexander Henricus Waltherus Van Eeuwijk, Eindhoven (NL); Robert Martinus Hendrikus Takken, Eindhoven (NL); Hilbrand Vanden Wyngaert, Grobbendonk (BE); Huon Urbald Ogier Norbert Van De Laarschot, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/569,963

(22) PCT Filed: Apr. 7, 2016

(86) PCT No.: PCT/EP2016/057559
§ 371 (c)(1),
(2) Date: Oct. 27, 2017

(87) PCT Pub. No.: WO2016/173815
PCT Pub. Date: Nov. 3, 2016

(65) Prior Publication Data
US 2018/0158220 A1 Jun. 7, 2018

(30) Foreign Application Priority Data
Apr. 28, 2015 (EP) ...................................... 15165358

(51) Int. Cl.
*G06K 9/36* (2006.01)
*G06T 11/60* (2006.01)
(Continued)

(52) U.S. Cl.
CPC .......... *G06T 11/60* (2013.01); *G06F 16/5854* (2019.01); *G06K 9/6215* (2013.01)

(58) Field of Classification Search
CPC . G06F 16/29; G06F 16/5854; G06K 9/00671; G06K 9/32; G06K 9/3216; G06K 9/4671; G06K 9/6215; G06T 11/60
See application file for complete search history.

(56) References Cited

U.S. PATENT DOCUMENTS 8,805,091 B1 * 8/2014 Hensel ................. G06T 3/4038
345/629
8,933,929 B1 * 1/2015 Filip ...................... G06F 16/29
345/419

(Continued)

FOREIGN PATENT DOCUMENTS

EP 2801958 A1 12/2014
JP 2002262180 A 9/2002

(Continued)

OTHER PUBLICATIONS

Ashok, Ashwin, et al., "Do Not Share! Invisible Light Beacons for Signaling Preferences to Privacy-Respecting Cameras," ACM, 2014 ISBN: 978-1-4503-3067-1 (6 Pages).

*Primary Examiner* — Xin Jia
(74) *Attorney, Agent, or Firm* — Meekakshy Chakravorty

(57) ABSTRACT

A spatial relationship is determined between a first image of a first region of a physical space, and a second image of a second region of that space; and the first and second images are thereby stitched together into a composite image comprising first and second areas derived from the first and second images respectively. Further, there is detected an embedded signal having been embedded in light illuminating at least part of the first region of the physical space upon capture of the first image, the embedded signal conveying metadata relating to at least part of the physical space. An (Continued)

effect applied to at least part of the first area of the composite image based on the detected metadata; and also, based on the detected metadata and on the determined spatial relationship between the first and second images, the effect is applied to at least part of the second area of the composite image that extends beyond the first area.

18 Claims, 3 Drawing Sheets

(51) Int. Cl.
*G06F 16/583* (2019.01)
*G06K 9/62* (2006.01)

(56) References Cited

U.S. PATENT DOCUMENTS

| | | |
|---|---|---|
| 9,129,181 B1 * | 9/2015 | Nathan ................. G06K 9/3241 |
| 2014/0185920 A1 | 7/2014 | Kelley et al. |
| 2015/0145992 A1 * | 5/2015 | Traff ........................ G06T 11/60 |
| | | 348/143 |
| 2017/0161929 A1 * | 6/2017 | Nakata ..................... G06F 13/00 |
| 2017/0270630 A1 | 9/2017 | Creusen et al. |

FOREIGN PATENT DOCUMENTS

| | | |
|---|---|---|
| JP | 2005333359 A | 12/2005 |
| JP | 2011141828 A | 7/2011 |
| JP | 2012060216 A | 3/2012 |
| JP | 2013171523 A | 9/2013 |
| WO | 2010052558 A2 | 4/2010 |
| WO | 2015036903 A2 | 3/2015 |

* cited by examiner

METADATA IN MULTI IMAGE SCENES

CROSS-REFERENCE TO PRIOR APPLICATIONS

This application is the U.S. National Phase application under 35 U.S.C. § 371 of International Application No. PCT/EP2016/057559, filed on Apr. 7, 2016, which claims the benefit of European Patent Application No. 15165358.1, filed on Apr. 28, 2015. These applications are hereby incorporated by reference herein.

TECHNICAL FIELD

The present disclosure relates to the inclusion of metadata in an image of a scene, and particularly in a composite image created from multiple individually-captured images stitched together using image processing techniques.

BACKGROUND

A street viewing service is a service that captures images of the scenery surrounding public roads and the like, in order to make these images available online. These services offer a user the ability to traverse through a virtualized view of the real world. Typically image capturing devices mounted on cars and potentially other modes of travel such as bicycles, etc., are used to systematically gather multiple images of the scenery surrounding the roads running throughout some part of the world, such as a given town, city, county, state or even a whole country. To build the virtualized view, adjacent ones of the gathered images are "stitched" together using known panoramic image processing techniques. Typically this virtualized view is made available online (via the Internet).

For example, each image captured by an image-gathering car of the street viewing service is typically linked to respective location data recording the location at which the image was captured, e.g. in terms of GPS coordinates, and this location data may in turn be linked to a map of an online mapping service. This allows the virtualized view to be made accessible through the mapping service as a front-end. The user can then access the virtualized view by accessing the mapping service through a browser or a dedicated app running on his or her smartphone, tablet, laptop or desktop computer, or the like. E.g. the user may drag and drop an icon onto a particular position on a street shown on an online map, and in response the online service then presents the user with a navigable virtual view of the surroundings starting from the selected position. Further, the location data allows additional information to be added in the virtualized view, for example as an overlay image. Currently this is used for showing the user the coordinates at which the image was taken, and for showing the street address or name of a building visible in the image.

In various jurisdictions, privacy and other regulations apply requiring images of, for example, license plates and faces to be blurred. Hence to comply with various privacy regulations in such jurisdictions, the images are processed to automatically detect license plates and faces and blur these. Also, for state security and other reasons certain buildings or details will not be captured or will be deleted at a later stage based on a manual request. In addition, users can request that elements in the virtualized view are censored or removed. An example would be the parents of a murdered child whose dead body was visible in the street viewing service, or sunbathers who in their gated backyard where not visible from eye level but were captured by the elevated camera on the image-gathering car, etc.

To remove or blur objects in the virtualized view of the street viewing service, images can be automatically analysed to detect certain predetermined types of objects such as license plates and human faces. Also, images can be manually reviewed and censored, or images can be marked as censored based on metadata such as the location (e.g. based on captured GPS coordinates), such that the service automatically obscures or removes any images associated with the relevant metadata.

SUMMARY

However, each of these approaches has one or more disadvantages, such as monetary cost, success rate (false positives and/or negatives), impact on the product, compliancy with local regulations, etc. For example, the current automated image processing tools used to blur license plates and faces are not perfect. Possible fines for non-compliance and the cost of manual processing of user requests are undesirable. Hence existing techniques are inefficient, error prone and/or not user friendly Nonetheless, an increased desire for privacy drives citizens to demand greater privacy protection. At the same time the added value of street viewing services are apparent and an increasing number of people make use of these services. For businesses these services offer valuable alternatives for providing information to (potential) customers.

It would therefore be desirable to provide a more advanced method for the processing of image data captured in public spaces, or the like.

According to one aspect disclosed herein, there is provided an image processing device (e.g. a server) comprising a stitching module configured to receive a first image of a first region of a physical space, and a second image of a second region of said physical space, and to determine a spatial relationship between the first image and the second image, and thereby stitch together the first and second images into a composite image comprising a first area derived from the first image and a second area derived from the second image (N.B. the first and second areas will usually partially overlap). The image processing device also comprises a signal detection module configured to detect an embedded signal having been embedded in light illuminating at least part of the first region of said physical space upon capture of the first image, the embedded signal conveying metadata relating to at least part of said physical space. Preferably the signal detection module does this by detecting the embedded signal from the first image itself (i.e. the signal is captured in the first image and extracted therefrom), though alternatively the signal may be detected by using a separate light sensor operating in association with the capture of the first image. Either way, the signal detection module is configured to apply an effect to at least part of the first area of the composite image based on the detected metadata, and also, based on the detected metadata and on the determined spatial relationship determined between the first and second images, to apply the effect to at least part of the second area of the composite image that extends beyond the first area (i.e. a part that does not overlap with the first area).

The invention thus provides a user friendly way for providing metadata related to a physical space captured by an image processing device, allowing for one or more advantages such as more efficient data processing, greater control for the user, and/or lower failure rate in applying the metadata. The system uses a light communication technique such as coded light to transmit metadata relating to a physical space. This can be beneficial for one or more of a number of reasons. For example, it can be beneficial compared to using radio frequency beacons (e.g. Bluetooth, Wi-Fi, RFID or the like) because it causes less RF pollution, and it can also be beneficial compared to using overtly visible marks (e.g. a QR code) because it can require lower resolution image capturing and/or can be less dependent on the position of the visible mark to the image capturing device. Also, in embodiments coded light can be captured by the same camera that is used to capture images, avoiding the need for additional sensors.

In embodiments, the effect applied based on the metadata may comprise removing or obscuring (e.g. blurring) said parts of the first and second areas of the composite image. Alternatively said effect may comprises preventing the composite image being stored, transferred or copied if it contains any of said parts of the first and second areas.

As another alternative, the effect need not be for privacy, but rather to provide information to the viewer or otherwise enhance the composite image. Hence said effect may comprise overlaying a graphical element over said parts of the first and second areas of the composite image, and/or overlaying a graphical element over the composite image in association with said parts of the first and second areas. E.g. the effect could comprise a message such as a "for sale" sign or a name of a business overlaid over or nearby the relevant areas of the composite image, and/or may comprise highlighting the areas in question.

In embodiments, the signal detection module may be configured to detect a position of a light source generating said light, and based on the detected position of the light source and on the determined spatial relationship between the first image and the second image, to determine an extent to which the metadata applies within the composite image and thereby determine said parts of the first and second areas.

For example, the metadata may specify that the image processing module is to obscure or remove parts of the composite image showing anything within a specified radius from the position of the light source within said physical space (e.g. blur all objects and other scenery within 10 m or 20 m radius of the position of the light source). In this case, the image processing module is configured to determine said extent in the composite image (i.e. the extent to which the metadata applies) as that corresponding to the specified radius from the position of the light source within said physical space.

In embodiments, the stitching module is configured to determine said spatial relationship between the first and second images based on a spatial relationship between first and second regions of the physical space. For example, the stitching module may be configured to determine the spatial relationship between the first and second regions of the physical space based on a positions at which the first and second images were captured as detected by a positioning system at a time of the capture (e.g. based on GPS coordinates captured by the camera or the camera-carrying vehicle).

Alternatively or additionally, the stitching module may be configured to determine said spatial relationship between the first and second images based on image recognition applied to the first and second images (i.e. by matching parts of recognizable objects in the first and second images to one another).

In a particularly preferred application, the image processing device may be arranged to make the composite image including said effect available online as part of a street viewing service.

In further embodiments, the stitching module and/or signal detection module, as appropriate, may be configured to perform operations in accordance with any of the image processing features disclosed herein.

According to another aspect disclosed herein, there is provided a system comprising the image processing device according to any embodiment disclosed herein, and also a camera configured to capture the first and second images. In embodiments, the camera may be mounted on a vehicle such as a car, which travels about and systematically gathers images of its surroundings including the first and second images, and records respective locations (e.g. GPS coordinates) at which those images were captured as it goes. The gathered images and associated locations can then be used by the stitching module to create the composite image.

According to another aspect disclosed herein, there is provided a method comprising: receiving a first image of a first region of a physical space, and a second image of a second region of said physical space; determining a spatial relationship between the first image and the second image, and thereby stitching together the first and second images into a composite image comprising a first area derived from the first image and a second area derived from the second image; detecting an embedded signal having been embedded in light illuminating at least part of the first region of said physical space upon capture of the first image, the embedded signal conveying metadata relating to at least part of said physical space; and applying an effect to at least part of the first area of the composite image based on the detected metadata, and also, based on the detected metadata and on the determined spatial relationship between the first and second images, applying the effect to at least part of the second area of the composite image that extends beyond the first area.

According to another aspect disclosed herein, there is provided a computer program product comprising code embodied on a computer-readable storage medium and/or being downloadable therefrom, the code being configured so as when run on a signal processing device to perform operations of: receiving a first image of a first region of a physical space, and a second image of a second region of said physical space; determining a spatial relationship between the first image and the second image, and thereby stitching together the first and second images into a composite image comprising a first area derived from the first image and a second area derived from the second image; detecting an embedded signal having been embedded in light illuminating at least part of the first region of said physical space upon capture of the first image, the embedded signal conveying metadata relating to at least part of said physical space; and applying an effect to at least part of the first area of the composite image based on the detected metadata, and also, based on the detected metadata and on the determined spatial relationship between the first and second images, applying the effect to at least part of the second area of the composite image that extends beyond the first area.

In embodiments, the method may comprise operations or the computer program may be configured to perform operations in accordance with any of the image processing features disclosed herein.

BRIEF DESCRIPTION OF THE DRAWINGS

To assist understanding of the present disclosure and to show how embodiments may be put into effect, reference is made by way of example to the accompanying drawing in which.

DETAILED DESCRIPTION OF EMBODIMENTS

The following describes a system and method which uses coded light, emitted towards an image capturing device, to provide the image capturing device with metadata (such as privacy settings). This metadata is then used in the processing of the captured images. However, a single scene (e.g. the left side of a particular road) is not captured in a single image. Rather, multiple smaller images are taken and these are then 'stitched' to create a larger image encompassing the scene. To accommodate this, the method comprises: (i) capturing first image data, comprising coded light, of a first region in a physical space, (ii) capturing second image data of a second region, different from the first region (and which may be partially overlapping), in the physical space; (ii) determining a spatial relationship between the first and the second image data based on a spatial relationship between the first and the second region (iv) extracting, from the coded light, metadata related to at least the second region; and (v) processing at least the second image data based on the extracted metadata and the determined spatial relationship between the first and the second region.

Figure 1:
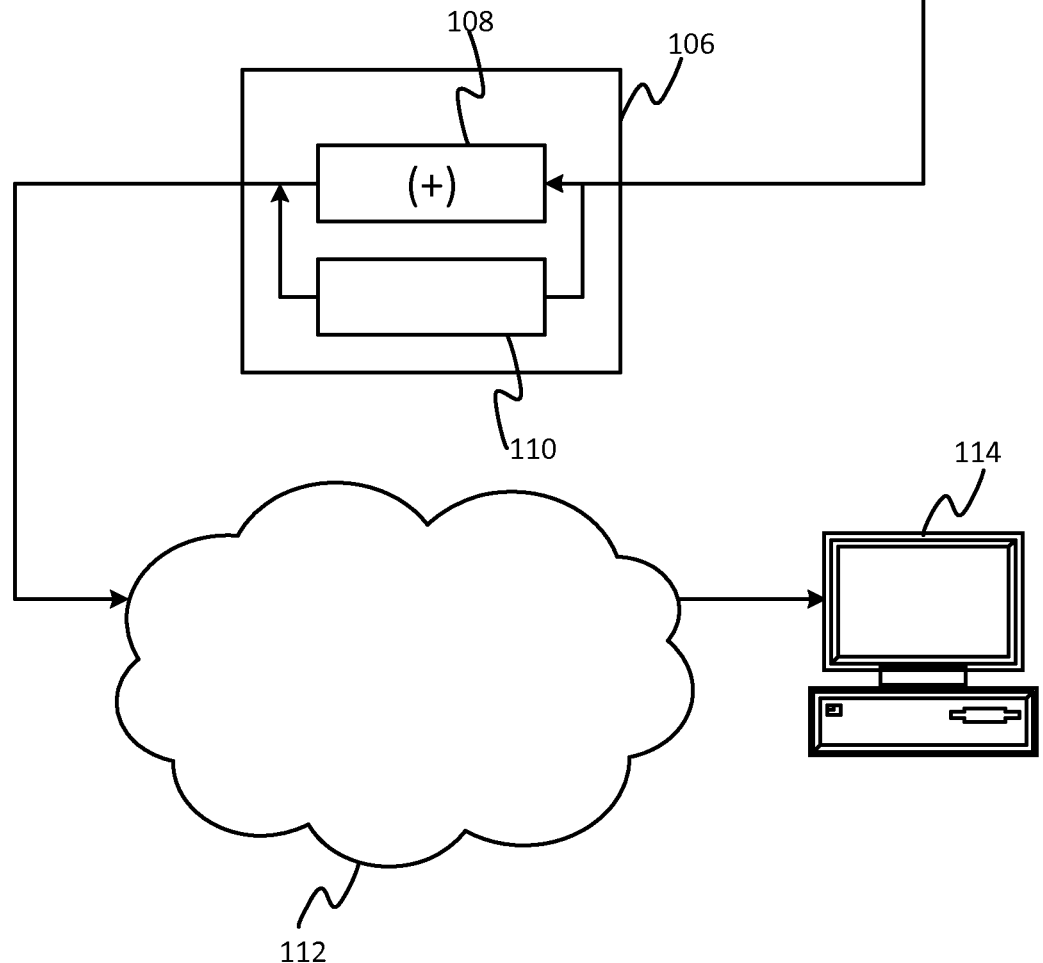
FIG. 1 is a schematic illustration of a system for capturing and stitching images.

FIG. 1 illustrates a system in accordance with embodiments of the present disclosure. The system comprises three components to work together: (a) a lighting device 102 for emitting coded light; (b) an image capturing device 104 for capturing photographic images; and (c) an image processing device 106 for processing the images, and in embodiments making them available as part of a street viewing service.

The lighting device 102 is deployed as part of a scene 100 (i.e. a physical space) comprising one or more objects 101 with which a user wishes to associate metadata. For instance, the one or more objects 101 may comprise one or more buildings, and the user may be an owner of the buildings. As will be discussed in more detail shortly, the metadata is included by means of a signal embedded in the light emitted by the lighting device 102. The metadata may comprise an indication that the user wishes a certain degree of privacy to be respected by a street viewing service, e.g. wants the building(s) 101 to be blurred when appearing in the street viewing service. Alternatively the metadata may comprise information that the user wishes to be shown in association with the building(s) or object(s) 101 when viewed through the street viewing service, e.g. the fact that a building 101 is for sale.

The image capturing device 104 takes the form of a camera unit mounted on a vehicle 105 driven by a human or computer operator. E.g. the vehicle may take the form of an automobile such as a car, van, motorcycle; or may take the form of a manually powered vehicle such as a bicycle or handcar. Alternatively the camera unit 104 may be carried about the person of a human operator, either riding in a vehicle 105 or on foot. The vehicle 105 and/or human operator may be part of an operation run or commissioned by a provider of the street viewing service. In this case the vehicle 105 or operator will typically be instructed to systematically traverse a system of roads in the environment of interest (e.g. in a certain town or city). During this systematic journey, the camera 104 is arranged to capture multiple images (photographs) at different respective positions along each road, and to submit these images to the street viewing service as it/he/she goes. Alternatively, the operator of the camera 104 could be a user having no particular association with the street viewing service, but who voluntarily submits images on an ad hoc basis (if enough users do this, the street viewing service can gradually build up a sufficient database of images).

Either way, the images are submitted to an image processing device 106 in the form of a server of the street viewing service (note that a server as referred to herein refers to a logical or functional entity that may comprise one or more server units at one or more geographical sites). Further, in embodiments the camera 104 (or an accompanying device working in conjunction with it) is equipped with a client of a positioning system, arranged to use the positioning system to detect the location at which each of the images was captured. For example, the positioning system may be a satellite based positioning system such as GPS (Global Positioning System). The camera 104 (or accompanying device) is thereby arranged to record in association with each image a respective geographical position at which each respective image was captured, and to submit this to the server 106 in association with each respective image.

The server 106 comprises a stitching module 108 arranged to stitch together adjacent ones of the images into a panoramic whole, based on panoramic image processing techniques which are in themselves known in the art. In embodiments, the stitching module is configured to do this based on the geographic locations of the images as collected at the time of capture (e.g. GPS coordinates). Alternatively or additionally, the stitching could be performed based on object recognition techniques, i.e. if the stitching module 108 recognises one side or portion of an object and another (preferably overlapping) side or portion of the same object in another image, this recognition can be used to stitch together the adjacent images containing those portions of the object. The stitching module 108 may be implemented in software stored on one or more memory devices of the server 106 (e.g. a magnetic memory device such as a hard disk or an electronic storage device such as a flash memory) and arranged to run on one or more processors of the server 106 (or more generally the image processing device). Alternatively it is not excluded that the stitching module 108 could be implemented in dedicated hardware circuitry, or configurable or reconfigurable hardware (e.g. PGA or FPGA), or any combination of hardware and software.

The server 106 is arranged to make the resulting panorama created by the stitching available to the public in the form of a virtualized view, accessible via a wide area network such as the Internet 112. That is, a user of a user terminal 114 such as a smartphone, tablet, laptop or desktop computer can connect to the server 106 via the Internet 112 (e.g. using a web browser or dedicated app running on the user terminal 114), and thereby view and preferably navigate their way through the panoramic virtual view created as a result of the stitching performed by the stitching module 108. For example, the provider of the street viewing service may also be the provider of an online map service, making available a road map of a town, city, country, state, country or even the whole world via the Internet 112. In this case, a user runs a web browser or dedicated app on his or her user terminal 114, which operates the user terminal 114 to access the online mapping service from the server 106 via the Internet 112. The user terminal 114 thus displays the map (or a portion of it) to the user. The user is then able to select a particular point on the map, e.g. a particular point along a particular road. In response, the mapping service links to the street viewing service with the selected location, and the street viewing service provides the user terminal 114, via the Internet 112, with the virtual view corresponding to that location, to be displayed via a screen of the user terminal 114. The user may then use a user interface on the user terminal 114 to navigate the virtual view, such as by changing the angle, moving to a different position, and/or zooming in or out.

Thus based on the system outlined above, the camera 104 will capture multiple images of the physical location surrounding it (or on a single side of the road, etc.), with each image relating to a region in a physical space. For example an image is taken every meter that the car 105 moves forward. There will most likely be overlap between the images, which is advantageous for the image processing step as it allows for better stitching of the individual images to create a larger image covering multiple regions. If no information is available on how far the capturing device 104 has moved in between taking pictures, then spatial data could be extracted from the images based on at least the overlapping part of these images. Either way, the resulting virtualized view can then be made available to users in the form of a street viewing service or the like.

Figure 2:
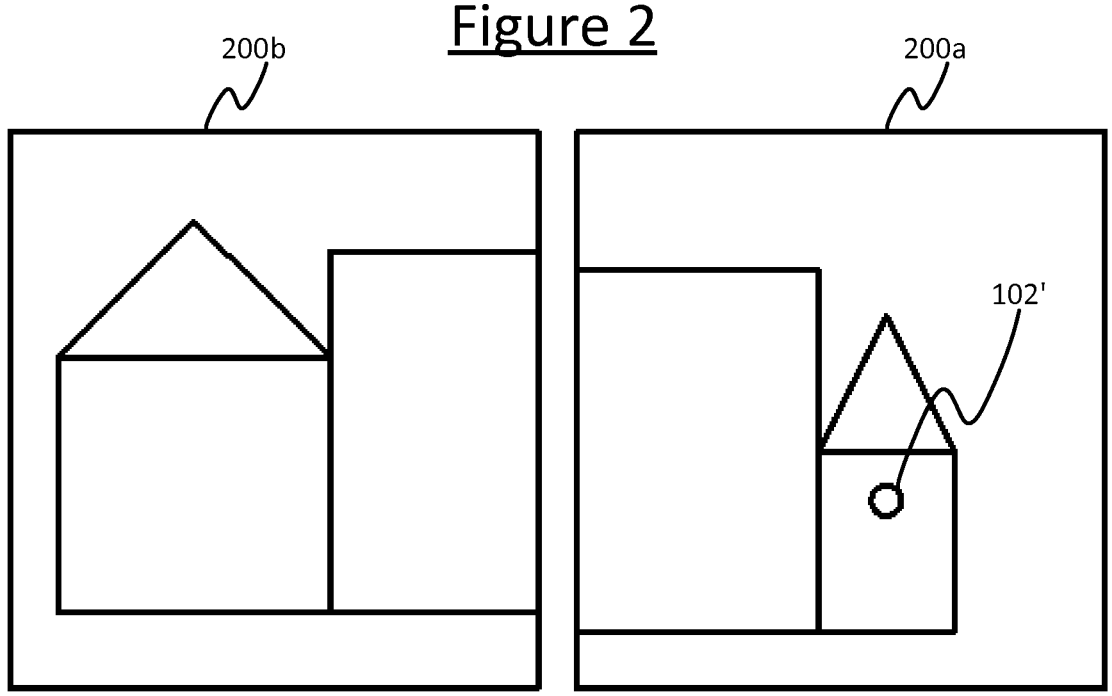
FIG. 2 is a schematic illustration of two individually captured images of a scene.

With reference to FIG. 2, consider for the sake of illustration a scene 100 (i.e. a physical space) comprising one or more buildings 101, wherein the scene 100 is captured by the camera 104 over two (or more) different images 200a, 200b taken from different positions such that the images 200a, 200b overlap to some extent but are not completely coincident. For example, the scene 100 may comprise a building, or a complex of buildings 101 such as a school, owned or leased by a given party, or being the site of an enterprise run by a given party. However, despite the fact that the building or complex 101 may fall within the ownership, responsibility or interest of a single party, it is large enough that it appears across multiple images 200a, 200b captured by the street viewing service, i.e. the building or complex 101 as a whole does not fall completely within any given one of the images 200a, 200b.

Figure 3:
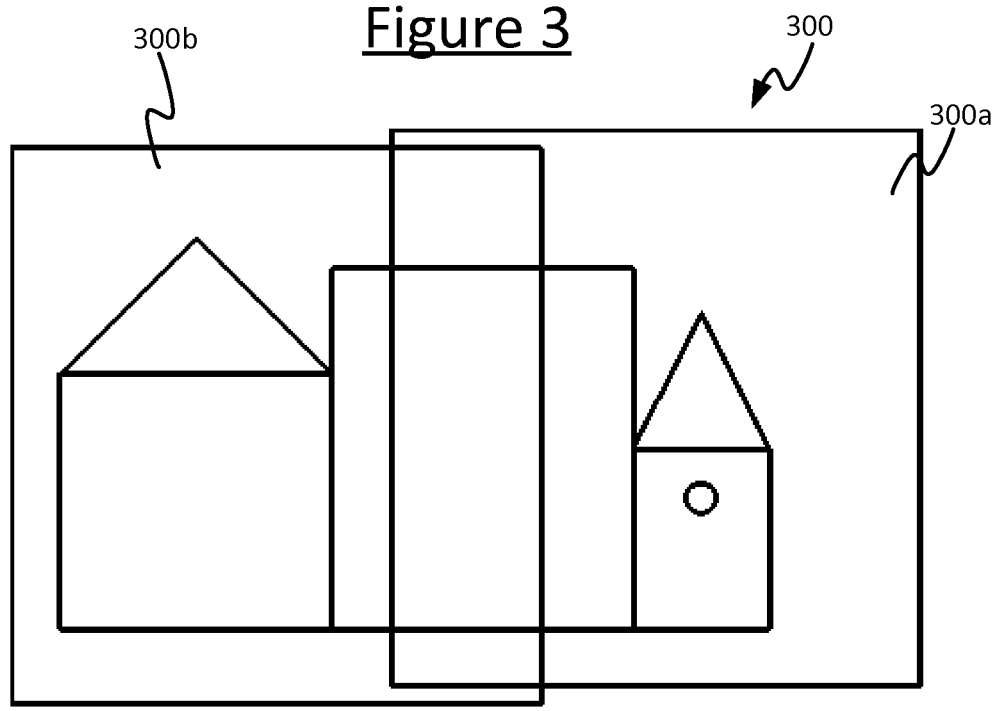
FIG. 3 is a schematic illustration of a composite image stitched together from two individually captured images.

Nonetheless, as shown in FIG. 3, the different adjacent images 200a, 200b are stitched together by the stitching module 108 into a composite image 300, comprising a first area 300a corresponding to the first captured image 200a and a second area 300b corresponding to the second captured image 300b (note that the first and second areas 300a, 300b of the composite image preferably overlap so as to assist stitching). Therefore the whole building or complex 101 does appear over the composite image 300, and will be visible to the public in this form through the street viewing service. It may be that a party having an interest in the building or complex 101 (e.g. the owner) wishes to apply metadata in relation to the image of the building or complex 101, and for this to apply across all the parts of the composite image 300 showing the building or complex 101 in question, not just the part in an individual one images 200a. For instance, the party may wish for the whole building or complex 101 to be censored (e.g. blurred) in the street viewing service, or may wish to highlight the whole building or complex 101 as being for sale.

According to embodiments of the present disclosure, the party wishing to apply the metadata deploys a lighting device 102 in the scene 100, either attached to, inside, or in the vicinity of the building or complex 101 in question. For example the lighting device 102 could be an outdoor luminaire fixed to an exterior surface of the building or complex 101, or a fixed or free-standing luminaire placed in the grounds of the building or complex 101, or even a luminaire located inside the building or complex but visible through a window or other opening. The lighting device 102 is configured to include an embedded signal in the visible light it emits, the signal comprising metadata relating to the building or complex 101. The lighting device 102 may be part of a general purpose illumination system with a primary purpose of illuminating the building or complex 101 or the scene 100, such that the embedded signal is embedded in the general purpose illumination. Alternatively the lighting device 102 may be a dedicated device with a dedicated purpose of emitting a signal by means of light.

Lighting devices for emitting embedded signals are in themselves known the art. One example is to use coded light, whereby the intensity of the light emitted by the light source 102 is modulated at a frequency high enough to be invisible to the human eye (or at least tolerably so). In embodiments, the modulation may comprise a single tone (sinusoid) or a single oscillating waveform (e.g. rectangular wave) and the frequency of this tone or waveform acts as an embedded code (i.e. different light sources each emit light with a different unique modulation frequency, unique within the system in question). This code can then be mapped to a predetermined meaning by means of a look-up performed at the receive side. Alternatively more complex modulation schemes are possible in order to embed more complex data. For example the modulation frequency may be varied to represent data according to a frequency keying scheme, or the phase of the modulation frequency may be varied to represent data according to a phase keying scheme, or the amplitude of the modulation may be varied to represent data according to an amplitude keying scheme (e.g. a Manchester code). In such cases the information to be conveyed can be embedded explicitly into the light, or again can be looked up at the receive side based on a received code.

Other forms of embedding a signal into light may comprise using the spectral composition of the light to convey information, or embedding an unobtrusive spatial pattern into the illumination illuminating the building or complex 101 or the scene 100.

By any such means, the lighting device 102 can thus be configured to emit light embedded with a signal communicating any desired metadata relating to a physical location 100, such as a particular building or complex 101 at that location. Such metadata can be privacy related data such as what privacy setting a user has selected, e.g.: blur image data showing people or people's faces, or do not capture any image within three meters of the light source, or blur 20 meters around the light source (=BL_20_CTR). Alternatively the metadata may comprise other data such as to provide information relating to the scene 100, e.g. "property for sale", "yard sale coming up on January 2nd", or "the names of the stores located in this building are 'Hugh's Pharmacy', 'Super Burgers, [etc.]'").

The image capturing device 104 may take any suitable form known in the art. It is configured to both capture images 200*a*, 200*b* of the scene 100 as it passes, and also to capture the coded light, preferably as part of the captured image itself. For example, the camera 104 may take the form of a rolling-shutter camera in which the pixels of the image sensor are grouped into a plurality of lines (e.g. horizontal rows), and the camera 104 captures an image by exposing each of the lines in a sequence, line-by-line at slightly different successive times. Thus each line captures the light from the light source 102 at a slightly different time, and hence a different phase of the modulation. If the line rate is high enough relative to the modulation frequency, this therefore enables the modulation to be detected in the image 200*a*. If the code is short enough relative to the number of lines in a frame, then the code can be detected in a single frame; or otherwise the code can be detected over multiple frames of a video image. Also, if the camera is not a rolling shutter camera but rather a global shutter camera which exposes the whole frame at once, then the coded light can still be detected from a video image if the frame rate is high enough relative to the modulation frequency. Suitable coded light techniques will in themselves be familiar to a person skilled in the art.

The image processing module 106 comprises a coded light detection module 110 arranged to extract the coded light signal from the images captured and submitted by the camera 104. The coded light detection module 110 may be implemented in software stored on one or more memory devices of the server 106 (e.g. a magnetic memory device such as a hard disk or an electronic storage device such as a flash memory) and arranged to run on one or more processors of the server 106 (or more generally the image processing device). Alternatively it is not excluded that the coded light detection module 110 could be implemented in dedicated hardware circuitry, or configurable or reconfigurable hardware (e.g. PGA or FPGA), or any combination of hardware and software.

Once the coded light has been extracted, the metadata and related actions can be determined. In embodiments, this will comprise modifying the image 300 as made available through the street viewing service. For example, the metadata may cause the view to be blurred around a certain building or complex, or a certain radius around the light source 102.

Thus the image capturing device 104 of the street-viewing service will capture the coded light metadata appearing in the first image 200*a*, and adapt the view 300 made available to the public accordingly.

In the example shown, the light source 102 appears in the first image 200*a*. It is known to use coded light as a means for watermarking a scene, so any given image capturing the coded light will contain the watermark (e.g. in previous applications, so that unauthorized images can be forensically identified later). However, it has not previously been recognized that coded light detected in a first image 200*a* covering a first region of a scene 100 may in fact also be intended to cover a second region of a scene 100 appearing only in a second image 200*b*, even though the coded light may not necessarily quite be detectable in the second image 200*b*.

According to embodiments herein, this is addressed by using the spatial relationship determined by the stitching module 106 in order to apply the coded light metadata detected in one image 200*a* to another, adjacent image 200*b*. That is, the coded light detection module 110 is configured to modify the composite image 300 to apply some effect 401 (e.g. see FIGS. 4 and 5) based on the metadata detected from the first captured image 200*a*, wherein this effect is applied not just to the area 300*a* of the composite image 300 derived from the first captured image 200*a* (or a part of it), but also the area 300*b* of the composite image 300 derived from the second captured image 200*b* (or again to a part of it).

As discussed, the image capturing device 104, such as a camera unit mounted on a car 105 of the street viewing service, will capture multiple images of the physical location surrounding it (or on a single side of the road, etc.). Each image relates to a region in the physical space, for example an image is taken every meter that the car moves forward, and there will most likely be overlap between the images, which is advantageous to assist in the 'stitching' of the individual images 200*a*, 200*b* to create a larger image 300 covering multiple regions.

As part of capturing the images, the coded light emitted by the lighting device 102 is also captured. In various scenarios, the lighting device 102 may be captured directly in the image 200*a* (i.e. the source of the coded light can be pinpointed), or the coded light may be directly received yet the lighting device 102 is not visible (e.g. the lighting device is located in a room and the light exits through a window towards the camera 104), or the coded light may be indirectly received (i.e. the light reflects off an object towards the camera 104).

The image processing device 106 now has multiple images related to various regions. In the process of capturing at least one image 200*a*, coded light has been captured (note that the capturing of the coded light can be part of the same step as capturing the image 200*a* or it can be a separate step, e.g. at the same moment, just before or after the image 200*a* is captured; and although the same sensor, i.e. the camera 104, can be used, this is not necessarily required). The metadata is extracted from the coded light and can be used in processing multiple of the images 200*a*, 200*b*. The image processing device(s) 106 will use the images 200*a*, 200*b* taken and the metadata extracted from the coded light, and determine a relationship between a first and a second image 200*a*, 200*b*. The first image 200*a* relates to a first region of a physical space wherein coded light data is captured (either as part of taking this same image or in a separate step). The second image relates to a second region. There is a spatial relationship between the first and the second region, and by determining this relationship a spatial relationship between the first and second images 200*a*, 200*b* is also determined. The coded light data captured in the first region can then be applied to the second (or further) image(s) 200*b*.

The metadata embedded in the coded light emitted by the light source can refer to various types of requests or information. For example, the metadata may specify that the image (or parts of it) should be blurred, e.g. "blur this house", or "BL_20_CTR" (=blur 20 meters around light source"; instructing the image processing device 106 to determine location of light source 102 in stitched image, determine the radius based on spatial information, and blur within 20 meters of the light source 102). Alternatively the metadata may specify that information is to be displayed in association with the image (or parts of it), e.g. "for sale", "show business name on street viewing service", or address data such as "lower floor=Main street 5*a*; upper floor=Main street 5*b*".

Given the limited bandwidth of coded light applications, such information does not need to be directly encoded but instead the metadata encoded can be a reference to a website or an online services that links to this data. The link to the metadata may itself comprise a link to further information, for example allowing to link interior photos to the exterior view of a building.

In embodiments, the metadata is linked to the first image 200a and the further processing takes place at a later stage, after capture, by another device such as the server 106 which has more computing power than the camera 104. Alternatively, the metadata may even cause the capturing device (camera) 104 to directly execute the request.

As an example use case, a house may be captured in multiple images 200a, 200b that are stitched together to create a single image 300 which then comprises the complete home. The coded light has been captured for only a single image 200a, yet as the images 200a, 200b are spatially related (and this is the basis for the stitching) the processing is applied across the two (or more) images 200a, 200b. E.g. the coded light emitted by the lighting device 102 is extracted from the first image 200a and specifies that the house should be be blurred. As part of the image processing, the house is recognized in the composite image 300 and the blurring is performed for those parts of the image 300 that comprise the house, spanning the parts of the house shown in both the areas 300a, 300b derived from both the first and second captured images 200a, 22b respectively.

Figure 4:
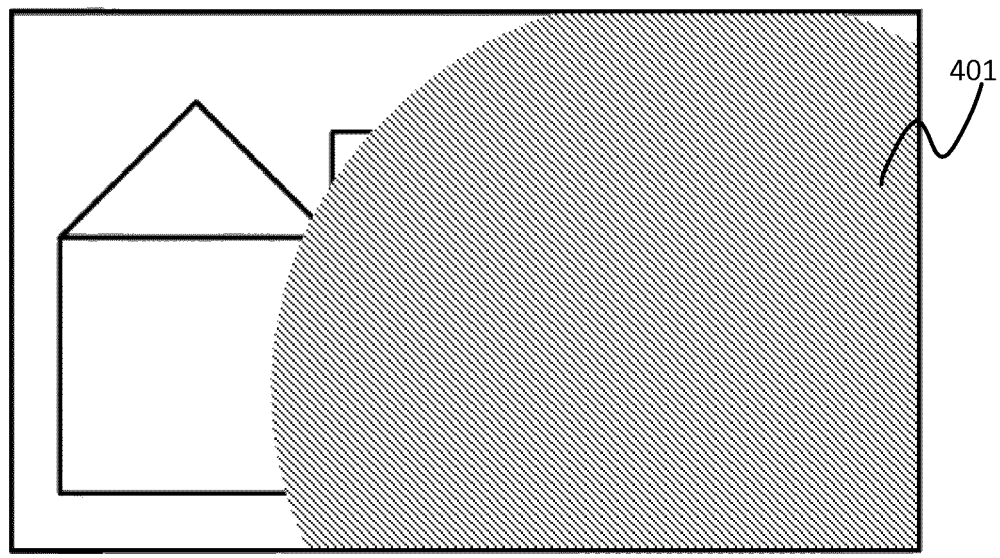
FIG. 4 is a schematic illustration of a composite image blurred based on metadata detected in relation to the image.

A more complex example is illustrated in FIG. 4. Here, the metadata does not specify that the house or complex 101 per se should be blurred, but rather states that a region corresponding to a specified radius of, say, 10 meters around the coded light source 102 should be blurred. Now spatial information is needed to determine which pixels relate to this zone of 10 meters. For example, the street viewing service may capture such information using laser based distance measurements and tag this information to the images 200a, 200b captured; or other options to extract such spatial information include using stereoscopic images with the two cameras at a known distance apart and at a known angle, or determining dimensions of an object in the image based on known sizes of specific objects recognized (e.g. the width of a door), or any other suitable image recognition techniques. Based on this information, the coded light detection module 110 on the image processing device 106 (e.g. server) applies the blurring effect 401 to the parts of the stitched image 300 that correspond to (an approximation of) a radius of 10 meters from the light source 102 in the physical space 100. If the lighting device 102 is not visible in the image 200a, 300 (e.g. it is hidden and/or only a reflection of the light is captured), additional processing could be needed. For example the approximate position of the lighting device 102 can be determined based on the direction of the light captured, shading or fading of the light being visible in the image, etc.

Figure 5:
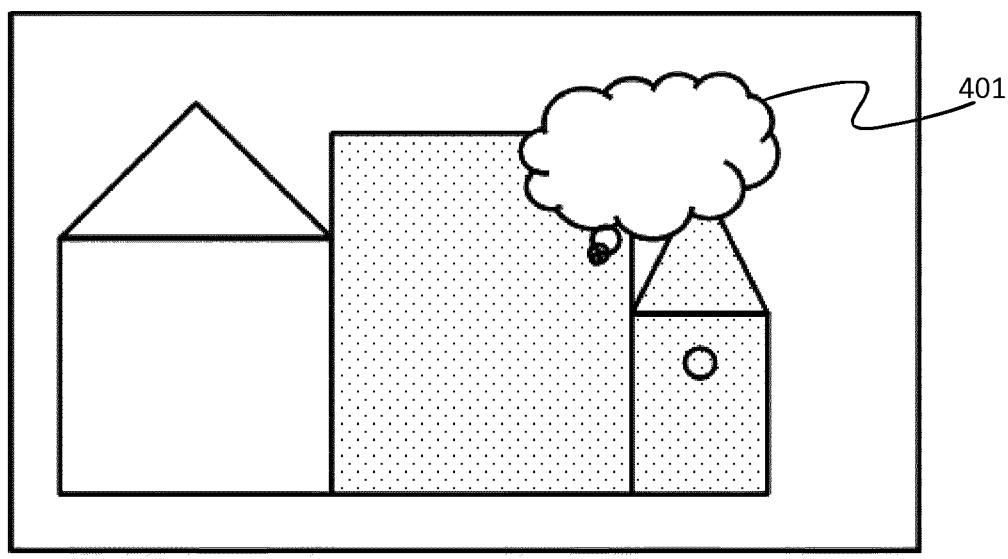
FIG. 5 is a schematic illustration of a composite image with information overlaid based on metadata detected in relation to the image.

Another example is illustrated in FIG. 5. Here, the metadata specifies information to be displayed in relation to a certain building. In this case the effect 401 to be added to the composite image 300 comprises overlaying the information over the image. For example, the effect 401 may comprise highlighting the building in question within the composite image 300, and/or adding a message such as "FOR SALE". For example for the purpose of the highlighting, the bounds of the building could be specified by the metadata in terms of geographical coordinates within the physical space 100, and the coded light detection module 110 may convert these to coordinates in the composite image 300. Similarly, for the purpose of the message the metadata may specify a position for displaying this message, e.g. relative to the physical space 100, such as a certain set of geographical coordinates, and these may be converted to the coordinates of the image. Alternatively the metadata may specify "apply to this building", and the coded light detection module 110 may additionally apply image recognition techniques to recognise the building closest to the source 102 of the coded light, and by this means apply the highlighting and/or message at the appropriate place within the image 300.

It will be appreciated that the above embodiments have been described only by way of example.

For instance, the applicability of the present disclosure is not limited to street viewing services. Also, the image processing device 106 is not limited to being implemented in a server. E.g. the techniques disclosed herein could also be used to apply metadata to panoramic images created on a personal computer unit, such as a personal camera unit or a smartphone or tablet by which the constituent captured images are captured, or a desktop or laptop computer to which captured images are downloaded. In these cases, the image processing device 106, including the stitching module 108 and coded light detection module 110, may be implemented on the personal computer unit, rather than a server 106. Alternatively even if the panoramic image is for personal use, the processing could be offloaded to an image processing device 106 implemented on a server, but as a personal panoramic image processing service for a user's own personal images rather than as part of a public street viewing service.

Further, the metadata may specify other types of censorship effect, not just blurring or other such forms of obscuration. For example, the metadata may specify that an image should not be allowed to be captured at all if it contains any part to which the metadata privacy setting relates, such that any image 200a, 200b, 300 containing any part to which the metadata relates (e.g. any part of a certain building or complex 101) is not allowed to be stored in any non-volatile form upon capture and instead should be immediately deleted. In this case the image processing device 106 is implemented as part of the capturing camera unit 104; and the coded light detection module 110 of the image processing device 106 is arranged to automatically act on the privacy setting as specified by the metadata, by immediately deleting the offending image from whatever temporary logic (e.g. RAM, registers or latches) that it is temporarily held in.

As another example, the metadata may specify that any image 200a, 200b, 300 containing any part to which the metadata relates (e.g. any part of a certain building or complex 101) is not allowed to be transferred to any other, external destination such as another, external computer unit (or is not allowed to be transferred to one or more particular specified prohibited destinations, or is only allowed to be transferred to one or more particular specified approved destinations). In this case, the image processing device 106 may again be implemented as part of the capturing camera unit 104, or any other computing unit that might potentially receive and disseminate such an image (e.g. a separate user terminal or a server); and the coded light detection module 110 of the image processing device 106 is arranged to automatically act on the privacy setting as specified by the metadata, by automatically blocking the offending image from being received and/or forwarded.

As yet another example, the metadata may specify that any image 200a, 200b, 300 containing any part to which the metadata relates (e.g. any part of a certain building or complex 101) is not allowed to be uploaded to any social media service or other such public service (or is not allowed to be uploaded to one or more particular specified prohibited services, or is only allowed to be uploaded to one or more particular specified approved services). In this case, the image processing device 106 may again be implemented as part of the capturing camera unit 104, or any other computing unit that might potentially receive and disseminate such an image (e.g. a separate user terminal), or any server that hosts a public service that might potentially publish the image; and the coded light detection module 110 of the image processing device 106 is arranged to automatically act on the privacy setting as specified by the metadata, by automatically blocking the offending image from being uploaded and/or accepted for publication.

Further, the scope of the present disclosure is not limited to applying metadata in relation to a building or complex of buildings 101. In general the metadata may relate to any scene (any physical space) which may comprise for example one or more particular buildings, people, plants, art installations, and/or exhibits, etc.

Further, the applicability of the teachings herein is not limited to two adjacent images. In general, the spatial relationship between any two or more images may be used to take the metadata from any embedded light signal detected in association with one image and to apply that metadata to any other one or more spatially related images or part(s) thereof.

Furthermore, the scope of the disclosure is not limited to still images, and in other embodiments analogous techniques may be used to stitch together adjacent video images, and apply light-based metadata detected from one such image to another.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An image processing device comprising:
    a stitching module configured to receive a first image of a first region of a physical space and a second image of a second region of said physical space, and to determine a spatial relationship between the first image and the second image, and thereby stitch together the first and second images into a composite image comprising a first area derived from the first image and a second area derived from the second image; and
    a signal detection module configured to detect an embedded signal having been embedded in light illuminating at least part of the first region of said physical space upon capture of the first image, the embedded signal conveying metadata relating to at least part of said physical space;
    wherein the signal detection module is configured to apply an effect to at least part of the first area of the composite image based on the detected metadata, and also, based on the detected metadata and on the determined spatial relationship determined between the first and second images, to apply the effect to at least part of the second area of the composite image that extends beyond the first area.

2. The image processing device of claim 1, wherein the signal detection module is configured to detect said embedded signal from the first image.

3. The image processing device of claim 1, wherein the signal detection module is configured to detect a position of a light source generating said light, and based on the detected position of the light source and on the determined spatial relationship between the first image and the second image, to determine an extent to which the metadata applies within the composite image and thereby determine said parts of the first and second areas.

4. The image processing device of claim 3, wherein the metadata specifies that the image processing module is to obscure or remove parts of the composite image showing anything within a specified radius from the position of the light source within said physical space, and wherein the image processing module is configured to determine said extent in the composite image as that corresponding to the specified radius from the position of the light source within said physical space.

5. The image processing device of claim 1, wherein said effect comprises obscuring or removing said parts of the first and second areas of the composite image.

6. The image processing device of claim 5, wherein said effect comprises obscuring said parts of the first and second areas of the composite image by blurring said parts.

7. The image processing module of claim 1, wherein said effect comprises preventing the composite image being stored, transferred or copied if it contains any of said parts of the first and second areas.

8. The image processing device of claim 1, wherein said effect comprises overlaying a graphical element over said parts of the first and second areas of the composite image, and/or overlaying a graphical element over the composite image in association with said parts of the first and second areas.

9. The image processing device of claim 1, wherein the stitching module is configured to determine said spatial relationship between the first and second images based on a spatial relationship between first and second regions of the physical space.

10. The image processing device of claim 9, wherein the stitching module is configured to determine the spatial relationship between the first and second regions of the physical space based on a positions at which the first and second images were captured as detected by a positioning system at a time of the capture.

11. The image processing device of claim 1, wherein the stitching module is configured to determine said spatial relationship between the first and second images based on image recognition applied to the first and second images.

12. The image processing device of claim 1, wherein the image processing device is arranged to make the composite image including said effect available online as part of a street viewing service.

13. A system comprising the image processing device of claim 1, and a camera configured to capture the first and second images.

14. The image processing device of claim 1, wherein said part of the second area is derived from a portion, of said second image, that depicts an area of said physical space that is excluded from said first image.

15. A method comprising:
    receiving a first image of a first region of a physical space, and a second image of a second region of said physical space;

determining a spatial relationship between the first image and the second image, and thereby stitching together the first and second images into a composite image comprising a first area derived from the first image and a second area derived from the second image;

detecting an embedded signal having been embedded in light illuminating at least part of the first region of said physical space upon capture of the first image, the embedded signal conveying metadata relating to at least part of said physical space; and applying an effect to at least part of the first area of the composite image based on the detected metadata, and also, based on the detected metadata and on the determined spatial relationship between the first and second images, applying the effect to at least part of the second area of the composite image that extends beyond the first area.

16. The method of claim 15, wherein said part of the second area is derived from a portion, of said second image, that depicts an area of said physical space that is excluded from said first image.

17. A computer program product comprising code embodied on a non-transitory computer-readable storage medium, the code being configured such that, when a processor executes the code, the processor performs a method comprising:

receiving a first image of a first region of a physical space, and a second image of a second region of said physical space;

determining a spatial relationship between the first image and the second image, and thereby stitching together the first and second images into a composite image comprising a first area derived from the first image and a second area derived from the second image;

detecting an embedded signal having been embedded in light illuminating at least part of the first region of said physical space upon capture of the first image, the embedded signal conveying metadata relating to at least part of said physical space; and applying an effect to at least part of the first area of the composite image based on the detected metadata, and also, based on the detected metadata and on the determined spatial relationship between the first and second images, applying the effect to at least part of the second area of the composite image that extends beyond the first area.

18. The computer program product of claim 17, wherein said part of the second area is derived from a portion, of said second image, that depicts an area of said physical space that is excluded from said first image.

* * * * *